United States Patent Office 3,346,612
Patented Oct. 10, 1967

3,346,612
PERFLUOROALKANE SULFONATE ESTERS
Robert L. Hansen, Roseville, Minn., assignor to Minnesota Mining and Manufacturing Company, St. Paul, Minn., a corporation of Delaware
No Drawing. Filed July 2, 1964, Ser. No. 380,017
9 Claims. (Cl. 260—456)

This invention relates to aryl esters of perfluoroalkanesulfonic acids and to the process for the preparation thereof.

The art has been informed by the work of others of the beneficial advantages to be obtained by the use for various purposes of compounds containing substantial percentages by weight of fluorinated compounds. For example, uses as surfactants, inert liquids and treatment of sheet materials have been proposed for various highly fluorinated materials. In general, very highly fluorinated materials are obtained directly by fluorination processes applied to suitable hydrocarbon materials. Mobile liquids which are highly fluorinated thus require extensive fluorination of corresponding hydrocarbons at considerable cost and result in relatively expensive products which therefore are of more limited applicability than the desirable features would otherwise dictate.

It is one object of this invention to provide inert fluorinated liquids.

Another object of this invention is to provide inert liquids having refractive indices above that of water.

A further object of this invention is to provide fluorinated liquids having sufficient inertness to be useful as low flammability lubricants and hydraulic fluids.

A further object of this invention is to provide lubricants and hydraulic fluids having low flammability for use at elevated temperatures.

Other objects of the invention will become evident from the disclosure herein.

In accordance with the above and other objects of the invention it has been found that aryl perfluoroalkanesulfonates possess extreme hydrolytic stability differing by orders of magnitude from heretofore known sulfonate esters and retain the useful properties of the fluorinated group with respect to lowered flammability and inertness. The ony critical feature of the aryl perfluoroalkanesulfonates of the invention is the possession of at least one sulfonate ester group having a perfluoroalkyl group attached to the sulfur atom and a cyclic aromatic system attached from an annular carbon atom to oxygen of the ester group. The terms perfluoroalkyl and perfluoroalkanesulfonate are used herein to include perfluorocycloalkyl and perfluorocycloalkanesulfonate respectively. The compounds of the invention thus include all aryl esters whether substituted or unsubstituted and having one or more rings whether fused or isolated and whether the perfluorinated residue is of the aliphatic or alicyclic series. The esters of the invention thus include, inter alia, perfluoroalkanesulfonates and also perfluorocycloalkanesulfonates of steroidal nuclei such as estrone, and the like, of dyestuff intermediates and dyestuffs having phenolic hydroxyl groups, of pharmaceutical intermediates and pharmacologically active materials comprising phenolic hydroxyl groups and of intermediates for synthetic resins such as polyphenols possessing phenolic hydroxyl groups.

The preferred class of aryl perfluoroalkanesulfonates are those of the formula: $(R_fSO_2O)_nArR_m$ wherein: $n$ is an integer from 1 to 4; $m$ is a number from 0 to 3; $R_f$ is perfluoroalkyl of 1 to 18 carbon atoms including perfluorocyclic alkyls; Ar is an aryl nucleus having a valence equal to the sum of $n$ and $m$ and having from 1 to 3 unsubstituted aromatic rings connected by no more than one atom by means of a member of the group consisting of carbon-to-carbon bonds and the divalent radicals

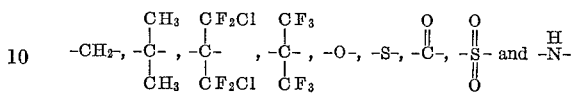

each R is a member of the group consisting of fluorine, chlorine, bromine, iodine, perfluoroalkyl of 1 to 18 carbon atoms, hydroxyl, aldehydo, carboxy-acyl of 2 to 7 carbon atoms, carboxyl, carboalkoxy, carbamido, nitrile, alkyl of 1 to 6 carbon atoms, alkenyl of 2 to 3 carbon atoms, phenoxy, benzyloxy, alkoxy having 1 to 6 carbon atoms and nitro and wherein $m$ is not greater than 1 when an R group comprising more than 2 atoms is present.

The compounds of this invention are prepared by reaction of the phenolic compound with perfluoroalkanesulfonyl fluoride. Although one might expect that such a reaction could be conventional, it is found in fact that perfluoroalkanesulfonyl fluorides react more difficultly than the conventional sulfonyl halides such as aromatic sulfonyl chlorides. Thus, although pyridine is a useful and conventional base for the reaction of sulfonyl chlorides with hydroxy compounds, it is completely ineffective other than as a solvent in the reaction of perfluoroalkanesulfonyl fluorides with phenols. A much stronger base is found to be necessary. Triethylamine is sufficiently strong and is employed in the examples herein although other lower trialkylamines and bases such as N-lower alkyl piperidines, alkali metal phenoxides, and the like, and generally bases having $pK_b$ values of about 6 or lower can be employed.

Because reactions are effected under rather strongly basic conditions it is desirable to provide a non-oxidizing atmosphere above the reaction mixture when even moderately readily oxidized phenols are employed. Such an atmosphere is readily provided by flushing the system continuously with nitrogen. Those skilled in the art will readily perceive other equivalent procedures.

After reaction, the base is removed by any suitable method or comibnation of methods such as distillation, washing with water to remove fluoride of the base and/ or with dilute aqueous acid.

The aryl perfluoroalkanesulfonates are conveniently manipulated in ethereal or other organic solvent from which they are recovered directly in sufficiently pure form for many purposes. If desired, traces of phenols which may remain are removed by washing with aqueous alkali or by passing a solution of the ester in non-hydroxylated solvent through a chromatographic column filled, for example, with activated alumina. The solvent is then removed and the residual ester crystallized or distilled as is appropriate for further purification.

The aryl perfluoroalkanesulfonates of the invention may be oily, or they may be waxy crystalline materials melting up to about 200° C. or higher. In all cases they are remarkably stable to hydrolysis and, in the absence of readily oxidizable substituent groups, they are stable for prolonged periods at elevated temperatures.

The fields of utility of the aryl perfluoroalkanesulfonates of the invention are quite varied and are particularly associated with the presence or absence of reactive substituent groups.

Those esters devoid of reactive groups, such as phenyl trifluoromethanesulfonate, phenyl perfluorooctanesulfonate, and 2,4-diphenoxyphenyl perfluorooctanesulfonate, which may nonetheless have halogen, perfluoroalkyl and other haloalkyl groups, and ether substituents and may include ether, sulfide, sulfone and hydrocarbon groups linking aromatic rings, are valuable as fire resistant lubricants, high dielectric fluids, hydraulic fluids, heat exchange fluids, plasticizers, and in oil and water repellent coatings, release coatings, wax modifiers and the like. Those esters which are crystalline under ordinary conditions are waxy solids and valuable for the above purposes when used at elevated temperatures, or for use as waxes, solid lubricants which may be used in the form of bars, sticks or powder, release coatings, and the like.

Perfluoroalkanesulfonate esters of aromatic compounds, such as 4-chloro-3-hydroxyphenyl and 4-acetyl-3-hydroxyphenyl perfluorooctanesulfonates, made as described hereinbelow to provide a residual free phenolic group, are valuable for incorporation in resins of the phenolic and epoxy types, or as acrylate or methacrylate esters in polymers of the vinyl type. They may further function in antioxidant compositions, for example, in fluxes, and in surfactant compositions.

Esters of the invention prepared from alkenyl substituted phenols, particularly possessing vinyl or allyl groups are usefully incorporated in polymers made by free radical catalysis such as polyacrylonitrile, polystyrene, polyacrylates, polymethacrylates, polyallyl resins, polydienes such as polybutadiene or in copolymers such as butadiene-styrene copolymers or acrylonitrile copolymer and terpolymers of which acrylonitrile-butadiene-styrene is an example.

Esters of the invention comprising carboxylic acid groups, such as 4-carboxyphenyl perfluorooctanesulfonate, and derivatives thereof such as esters, amides, halides, and salts are useful variously as surfactants, as intermediates in polyester and polyamide resins and as sequestrants.

Because of the high content of aromatic structure and stability of the sulfonate esters of the invention, these esters can be reacted by classical aromatic reactions of organic chemistry, e.g., nitration, sulfonation, and the like, to produce substituted materials useful as intermediates in dyestuffs, pharmaceuticals, photographic chemicals and other fine chemicals in which the perfluoroalkanesulfonate ester group provides a useful perfluorinated appendage. Other compounds of the invention are directly useful as intermediates for reactive groups; they contain as, for example, 4-aldehydophenyl trifluoromethanesulfonate.

Compounds of the invention possessing conjugated unsaturated systems, as in 4-benzoyl-3-hydroxyphenyl perfluorooctanesulfonate, combine the properties of fluorinated radicals and high absorptivity in the ultraviolet and are useful as ultraviolet absorbers.

Having thus described the invention in broad terms it is now more particularly illustrated by examples showing the best mode presently contemplated of practicing the invention.

EXAMPLE A

Because the conditions of preparation of the esters of the invention are strongly basic, it is desirable that the perfluoroalkanesulfonyl fluorides be purified so as to remove traces of impurities which lead to tars under strongly basic conditions. This represents no problem in the case of trifluoromethane- and pentafluoroethane-sulfonyl fluorides but higher members of the series as normally available may contain small amounts of materials which are sensitive to strong bases. This example illustrates a procedure which is advantageously employed for the purification of higher members of the series and such purified liquid sulfonyl fluorides will be understood to be employed in the subsequent numbered examples.

Two kilograms of commercial perfluorooctanesulfonyl fluoride (B.P. 154° to 155° at 740 mm. Hg pressure) is stirred under reflux with 250 ml. each of anhydrous triethylamine and pyridine for 16 hours. The solution is cooled and the fluorochemical phase is separated, and washed first with 250 ml. of cold pyridine, second with several portions of about 100 ml. each of 5% aqueous hydrochloric acid until all bases have been removed and then with 200 ml. of concentrated sulfuric acid (at 40° C.). The purified perfluorooctanesulfonyl fluoride is redistilled and is then suitable for use in the following procedures.

*Example 1*

A vessel fitted for stirring and with a sparger tube is charged with 95 g. (1 mole) of phenol, 135 ml. of triethylamine and 150 ml. of pyridine. Vapors of trifluoromethanesulfonyl fluoride are introduced rapidly through the sparger tube while stirring the mixture until absorption ceases. The reaction mixture is heated to 50° C. to expel excess trifluoromethanesulfonyl fluoride and the reaction mixture is evaporated under reduced pressure to remove a large part of the pyridine and triethylamine. The residue is poured into 800 ml. of ice water and the phenyl ester extracted with ether. The ethereal solution is washed successively with water, aqueous hydrochloric acid and water and then dried over anhydrous magnesium sulfate and evaporated to an oily residue. The residue is phenyl trifluoromethanesulfonate which is distilled under reduced pressure and boils at 53° to 55° C. at 1 mm. Hg pressure, $n_D^{25}=1.4438$. Calculated for $C_7H_5F_3O_3S$: 37.2% C; 25.2% F. Found: 37.4% C; 25.7% F.

*Example 2*

A vessel is charged with 50.2 g. (0.10 mole) of perfluorooctanesulfonyl fluoride and then 9.4 g. (0.10 mole) of phenol and 25 ml. of triethylamine are added. The mixture is heated under reflux for one hour and poured on a mixture of ice and at least sufficient hydrochloric acid to react with the amine. The organic material is taken up in ether and the ether washed with water and with dilute (about 10 percent) aqueous sodium hydroxide, with appropriate back washings. The combined ethereal extracts are washed with dilute salt solution to achieve better separation of phases and are then dried over anhydrous magnesium sulfate. Evaporation of the ether and distillation of the residual oil under reduced pressure yields phenyl perfluorooctanesulfonate as an oil boiling at about 150° to 154° C. at 22 mm. Hg pressure, $n_D^{25}=1.3735$, dielectric constant at 100 kc. of 6.6. Calculated for $C_{14}F_{17}H_5SO_3$: 29.2% C; 56.1% F. Found: 29.4% C; 55.8% F.

The above procedure is generally applicable to the preparation of perfluoroalkanesulfonates of both substituted and unsubstituted phenols when the substituents are not affected by the reaction conditions or the work up. Thus, it is more convenient to prepare the perfluoroalkanesulfonate of methyl salicylate and thereafter saponify the carboxylic ester group than to use salicylic acid intially. The stability of the sulfonate esters of the invention is so great that there is no difficulty in saponifying the carboxylic ester groups quantitatively without affecting the sulfonate ester group.

The following table enumerates other esters of the invention prepared by the above procedure and physical characteristics thereof. When more difficultly soluble phenols are employed, such as polynuclear phenols, it is convenient to employ pyridine, acetone or other non-hydroxylic solvents together with the triethylamine. The products are worked up either by distillation or crystallization as will be evident to those skilled in the art. In general, crystallization gives somewhat lower yields of higher perfluoroalkanesulfonates inasmuch as those acids contain greater or smaller amounts of isomers having non-linear skeletons.

TABLE I

| Example | Ester | B.P. (° C./mm. Hg) | M.P. (° C.) | $n_D$/° C. |
|---|---|---|---|---|
| 3 | 2-$C_6H_5C_6H_4OSO_2CF_3$ | 119/.07 | | 1.5192/24 |
| 4 | 2-$C_6H_5C_6H_4OSO_2C_8F_{17}$ | 120-34/.03 | | 1.4280/25 |
| 5 | $C_6H_5OSO_2CF_3$ | 53-5/1 | | 1.4438/25 |
| 6 | 3-$HCOC_6H_4OSO_2CF_3$ | 129-30/17 | | 1.4680/25 |
| 7 | 4-$HCOC_6H_4OSO_2CF_3$ | 130 1/17 | | 1.4713/25 |
| 8 | 2-$CH_3O_2CC_6H_4OSO_2CF_3$ | 102-111/.05 | | 1.4630/20 |
| 9 | 4-$CH_3O_2CC_6H_4OSO_2CF_3$ | 93-5/1.4 | | 1.4600/25 |
| 10 | 4-$CH_3O_2CC_6H_4OSO_2C_8F_{17}$ | | 58-9 | |
| 11 | 4-$HO_2CC_6H_4OSO_2C_8F_{17}$ | | 194-6 | |
| 12 | 3-$CH_3C_6H_4OSO_2C_8F_{17}$ | 100-15/.03 | | 1.3796/26 |
| 13 | 4-$CH_3OC_6H_4OSO_2C_8F_{17}$ | | 42-5 | |
| 14 | 4-$C_6H_5OC_6H_4OSO_2C_8F_{17}$ | | 58-60.5 | |
| 15 | 4-$C_6H_5CH_2OC_6H_4OSO_2C_8F_{17}$ | | 89-94 | |
| 16 | 4-$C_6H_5C_6H_4OSO_2CF_3$ | | 54-6 | |
| 17 | 4-$C_6H_5C_6H_4OSO_2C_8F_{17}$ | | 85-8 | |
| 18 | 2-$C_{10}H_7OSO_2C_8F_{17}$ | | 71-3.5 | |
| 19 | 4-$CF_3SO_2OC_6H_4NO_2$ | | 51-2 | |
| 20 | $CF_3SO_2$—O—(anthracene)—$CH_3O_2C$— | | 129-30 | |
| 21 | 2,4-$(C_6H_5O)_2C_6H_3OSO_2C_8F_{17}$ | 180/.06 | 47-52 | |

*Example 22*

A solution is prepared under nitrogen from 20.8 g. (0.125 mole) of dry potassium p-chlorophenoxide in 50 ml. of anhydrous pyridine and 63 g. (0.125 mole) of perfluorooctanesulfonyl fluoride is added. The reaction is brought to reflux and the homogeneous solution soon deposits KF. After 45 minutes the cooled solution is poured over 400 g. of ice containing sufficient concentrated HCl to neutralize all the pyridine. The cold aqueous slurry is filtered and the collected solid pressed dry and recrystallized from hot isopropyl alcohol. The product, p-chlorophenyl perfluorooctanesulfonate, melts at 45° to 49° C. Calculated for $C_{14}H_4ClF_{17}O_3S$: 27.5% C; 52.9% F; 0.6% H. Found: 27.4% C; 53.2% F; 0.9% H.

*Example 23*

A solution is prepared under nitrogen from 15.5 g. (0.066 mole) of dry potassium 2,4,6-trichlorophenoxide and 125 ml. of anhydrous pyridine and 33 g. (0.066 mole) of perfluorooctanesulfonyl fluoride is added and the mixture is warmed with stirring at 50° C. for one hour. A homogeneous solution forms which separates into two phases on cooling. The denser lower layer is separated, taken up in ether and washed with water, dilute acid and then dilute alkali as above. Further washes with water and dilute salt solution and drying as above give an ethereal solution which is distilled to give 28 g. of 2,4,6-trichlorophenyl perfluorooctanesulfonate as a liquid boiling at about 140° to 150° C. at about 0.5 mm. Hg pressure, $n_D^{25}$=1.4134. Calculated for $C_{14}H_2Cl_3F_{17}O_3S$: 24.8% C; 47.6% F. Found: 24.5% C; 47.3% F.

2,4,6-trichlorophenyl trifluoromethanesulfonate is prepared by analogous reactions and is a mobile liquid boiling at about 120° to 121° C. at 0.07 mm. Hg pressure, $n_D^{25}$=1.4987.

By the procedures of Examples 1 to 23 above employing corresponding molar proportions and appropriate sulfonyl fluorides, trifluoromethanesulfonates, perfluorocyclohexanesulfonates, perfluorooctanesulfonates, perfluoroethylcyclohexanesulfonates, perfluorododecanesulfonates and perfluorooctanedecanesulfonates are prepared from trifluoromethylphenol, perfluorooctylphenol, perfluorooctadecylphenol, dichlorophenol, monobromophenol, dibromophenol, tribromophenol, hydroquinone monomethyl ether, resorcinol monobenzyl ether, p-cresol, xylenol, hydroxybenzonitrile, hydroxyphthalodinitrile, 4-hydroxyacetophenone, vinyl phenol and allyl phenol.

*Example 24*

A vessel fitted for stirring and refluxed and with attached drying tube for the exclusion of moisture is charged with 115 g. (0.8 mole) of 4 - chlororesorcinol (M.P. 105–106° C.), 600 ml. of anhydrous triethylamine and 352 g. (0.7 mole) of perfluorooctanesulfonyl fluoride and the mixture is heated to reflux with stirring. The solution becomes homogenous after about 5 hours, and, after heating for one hour longer, the bulk of excess amine is removed by distillation first at atmospheric pressure and finally under reduced pressure. The oily organic residue is washed with 450 ml. of hot 5 percent aqueous hydrochloric acid and then with 200 ml. of boiling water, separated and allowed to cool. The straw-colored oil obtained in excellent yield solidifies slowly on cooling to a waxy solid melting about 25° to 40° C. It is 4-chloro-3-hydroxy-phenyl perfluorooctanesulfonate. Recrystallization from ethanol gives waxy solid melting about 41° to 44° C. Calculated for $C_{14}H_4ClF_{17}O_3S$: 26.8% C; 0.7% H. Found: 26.9% C; 0.8% H.

This material is a useful intermediate because it still possesses a reactive phenolic group. Other chloro-hydroxy-phenyl esters are obtained by employing other perfluoroalkanesulfonyl fluorides in corresponding molar proportions. Thus chloro-hydroxy-phenyl trifluoromethanesulfonate is obtained from trifluoromethanesulfonyl fluoride, chloro-hydroxyphenyl perfluorododecanesulfonate is obtained from perfluorododecanesulfonyl fluoride and chloro-hydroxyphenyl perfluorooctadecanesulfonate is obtained from perfluorooctadecanesulfonyl fluoride. By employing approximately twice the amounts of the perfluoroalkanesulfonyl fluorides, the 4 - chlorophenylene 1, 3 - bisperfluoroalkanesulfonates are obtained. These esters are worked up as in the above examples including washes with alkali to remove unreacted phenolic materials.

Other polyphenols are reacted as above to give perfluoroalkanesulfonate esters in which one or more phenolic groups are esterified. The bistrifluoromethanesulfonate of o,o'-dihydroxybiphenyl is a liquid boiling at 148° to 153° C. at 0.2 mm. Hg pressure, $n_D^{24}$=1.4944. The following table shows linear structural formulae of solid esters thus prepared.

TABLE II

| Example | | M.P., ° C. |
|---|---|---|
| 25 | 1,2-$C_6H_4(OSO_2C_8F_{17})_2$ | 60-3 |
| 26 | 1,3-$C_6H_4(OSO_2C_8F_{17})_2$ | 98-104 |
| 27 | 1,3,5-$C_6H_3(OSO_2C_8F_{17})_3$ | 136-9 |
| 28 | [2,4-$(CF_3SO_2)_2C_6H_3]_2CO$ | 114-5 |
| 29 | [2,4-$(CF_3SO_2O)_2C_6H_3]_2$ | 99-103 |
| 30 | 1,4-$C_6H_4(OSO_2CF_3)_2$ | 54-55.5 |
| 31 | (4-$CF_3SO_2OC_6H_4)_2SO_2$ | 108-14 |
| 32 | (2-$C_8F_{17}SO_2OC_6H_4)_2$ | 70.5 |
| 33 | 1,2-$C_6H_4(OSO_2CF_3)_2$ | 37-9 |
| 34 | 4-$CH_3CO$-2-HO—$C_6H_3$—$OSO_2C_8F_{17}$ | 83-5 |
| 35 | 2-HO-4-$C_8F_{17}SO_2O$—$C_6H_3COC_6H_5$ | 108-11 |
| 36 | (2-HO-4-$C_8F_{17}SO_2O$-$C_6H_3)_2CO$ | 258-60 |

By following the procedures of Example 24 above using appropriate proportions of the requisite sulfonylfluoride, mono- and bis-perfluoroethanesulfonates, mono- and bis-perfluorocyclohexanesulfonates, mono- and bis-perfluorooctanesulfonates, mono- and bis-perfluoroethylcyclohexanesulfonates, mono- and bis-perfluorooctadecanesulfonates and mono- and bis-perfluorododecanesulfonates are prepared from monobromocatechol, monobromoresorcinol, monochlorohydroquinone, mono-bromohydroquinone, monochlororesorcinol, monochlorocatechol, monohydroxy benzophenone, Bisphenol A, methylenebisphenol, methylenebisaniline, 2,2 - bis-p-hydroxyphenyl-hexafluoropropane and 2,2 - bis-p-hydroxyphenyl-1,3-dichloro-1,1,3,3-tetrafluoropropane.

*Example 37*

This example illustrates the stability of the aryl perfluoroalkanesulfonates of the invention to both acidic and basic conditions.

A solution of 20 g. of phenyl trifluoromethanesulfonate in 35 ml. of 80% by weight aqueous trifluoromethanesulfonic acid (a very strong acid) is stirred for 18 hours at 150° C. The ester is recovered by extraction and distillation in 90 percent yield.

By comparison, methyl trifluoromethanesulfonate hydrolyzes in alkaline or acidic aqueous solution very rapidly even at normal room temperatures. A sample of 1.64 g. (approximately 10 millimoles) of methyl trifluoromethanesulfonate (laboratory preparation, not specially purified) is dissolved in 10 ml. of methanol at 25° C. and Methyl Orange indicator is added. The solution is acidic. It is titrated to neutrality with 0.56 N methanolic sodium methoxide. About half of the ester has alcoholized within 1 minute (8.0 ml. of alkali solution required to neutralize). As the indicator shows the reappearance of acidity in the solution more alkali is added at intervals. In 4 minutes a total 16.0 ml. of alkali has been consumed. A further 1.1 ml. of alkali is necessary to neutralize the solution after 8 minutes and the solution does not again become acid indicating substantially quantitative saponification. This shows that the methyl trifluoromethanesulfonate has a half-life under these conditions of about 70 seconds. The titer is less than theoretical presumably as a result of cumulative experimental inaccuracies.

For comparison, a solution of 2.26 g. (about 10 millimoles) of phenyl trifluoromethanesulfonate in 100 ml. of methanol containing Methyl Orange remains neutral after 75 hours standing at room temperature. A portion of the same solution is heated in a sealed tube at 96° C. for 18 hours and remains neutral.

Two solutions, one of 3.03 g. (about 5 millimoles) of p-methoxyphenyl perfluorooctanesulfonate in 100 ml. of methanol containing Methyl Orange and of the other of 1.36 g. (about 5 millimoles) of p-nitrophenyl trifluoromethanesulfonate in 50 ml. of methanol containing Methyl Orange, remain neutral after standing for 24 hours at room temperature or after heating at 95° C. for 24 hours.

The aryl perfluoroalkanesulfonates of the invention are thus seen to possess a distinctly different kind of behavior in their stability.

What is claimed is:
1. A perfluoroalkanesulfonate of the formula

wherein: $n$ is an integer from 1 to 4; $m$ is a number from 0 to 3; $R_f$ is perfluoroalkyl of 1 to 18 carbon atoms including perfluorocyclic alkyls; Ar is an aryl nucleus having a valence equal to the sum of $n$ and $m$ and having from 1 to 3 unsubstituted aromatic rings connected by no more than one atom by means of a member of the group consisting of carbon-to-carbon bonds and the divalent radicals

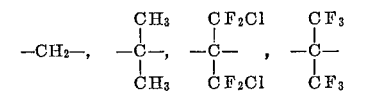

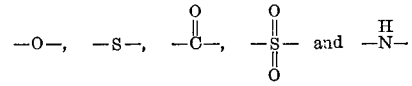

each R is a member of the group consisting of fluorine, chlorine, bromine, iodine, perfluoroalkyl of 1 to 18 carbon atoms, hydroxyl, aldehydo, carboxy-acyl of 2 to 7 carbon atoms, carboxyl, carboalkoxy, carbamido, nitrile, alkyl of 1 to 6 carbon atoms, alkenyl of 2 to 3 carbon atoms, phenoxy, benzyloxy, alkoxy having 1 to 6 carbon atoms and nitro and wherein $m$ is not greater than 1 when an R group comprising more than 2 atoms is present.

2. Phenyl trifluoromethanesulfonate.
3. Phenyl perfluorooctanesulfonate.
4. 4-chloro-3-hydroxyphenyl perfluorooctanesulfonate.
5. 4-benzoyl - 3 - hydroxyphenyl perfluorooctanesulfonate.
6. 2,4-diphenoxyphenyl perfluorooctanesulfonate.
7. 4-carboxyphenylperfluorooctanesulfonate.
8. 4-aldehydophenyl trifluoromethanesulfonate.
9. 4-acetyl-3-hydroxyphenyl perfluorooctanesulfonate.

References Cited
UNITED STATES PATENTS 2,894,971    7/1959    O'Rear et al. _____ 260—456
3,118,945    1/1964    Cohen _____ 260—456 X CHARLES B. PARKER, *Primary Examiner.*

F. D. HIGEL, *Assistant Examiner.*